(12) United States Patent
Platzer et al.

(10) Patent No.: US 7,892,386 B2
(45) Date of Patent: Feb. 22, 2011

(54) RADIATION-CURABLE FLUORESCING COMPOSITIONS

(75) Inventors: Stephan J. W. Platzer, Longmeadow, MA (US); Patrick S. Vaughn, Winsted, CT (US); Aysegul Kascatan Nebioglu, Winsted, CT (US)

(73) Assignee: Dymax Corporation, Torrington, CT (US)

( * ) Notice: Subject to any disclaimer, the term of this patent is extended or adjusted under 35 U.S.C. 154(b) by 775 days.

(21) Appl. No.: 11/844,542

(22) Filed: Aug. 24, 2007

(65) Prior Publication Data

US 2009/0050264 A1    Feb. 26, 2009

(51) Int. Cl.
| | |
|---|---|
| B29C 65/00 | (2006.01) |
| B32B 37/00 | (2006.01) |
| B32B 38/04 | (2006.01) |
| A61N 5/00 | (2006.01) |
| G21G 5/00 | (2006.01) |
| B05D 3/00 | (2006.01) |
| C08J 7/18 | (2006.01) |
| G21H 5/00 | (2006.01) |
| C08F 290/06 | (2006.01) |

(52) U.S. Cl. .............. 156/272.2; 156/275.5; 250/492.1; 427/553; 522/81
(58) Field of Classification Search .............. 156/272.2, 156/275.5; 250/492.1; 427/553; 522/81
See application file for complete search history.

(56) References Cited

U.S. PATENT DOCUMENTS

| | | | |
|---|---|---|---|
| 3,398,099 A | 8/1968 | Kleinerman | 252/301.18 |
| 3,524,103 A | 8/1970 | McCune | 361/244 |
| 4,455,741 A | 6/1984 | Kolodner | 438/16 |
| 4,563,494 A | 1/1986 | Ida | 524/398 |
| 5,006,503 A | 4/1991 | Byers et al. | 503/227 |
| 6,080,450 A * | 6/2000 | Cantor | 427/517 |
| 6,514,609 B1 | 2/2003 | Siggel et al. | 428/372 |
| 6,680,116 B2 | 1/2004 | Siggel et al. | 428/370 |
| 7,122,248 B2 | 10/2006 | Tam et al. | 428/397 |
| 7,192,471 B2 | 3/2007 | Potrawa et al. | 106/31.15 |
| 7,198,732 B2 | 4/2007 | Potrawa et al. | 252/301.26 |
| 2002/0028347 A1 | 3/2002 | Marrocco, III et al. | 428/690 |
| 2003/0106460 A1 | 6/2003 | Imanishi et al. | 106/31.14 |
| 2004/0131886 A1 | 7/2004 | Marrocco, III et al. | 428/690 |
| 2004/0220298 A1* | 11/2004 | Kozee et al. | 523/160 |
| 2004/0262575 A1 | 12/2004 | Potrawa et al. | 252/301.16 |
| 2005/0186443 A1 | 8/2005 | Marrocco et al. | 428/690 |
| 2006/0138381 A1 | 6/2006 | Shibata et al. | 252/62.54 |
| 2007/0051929 A1 | 3/2007 | Potrawa et al. | 252/586 |

FOREIGN PATENT DOCUMENTS

| | | |
|---|---|---|
| CA | 2019094 | 12/1990 |
| EP | 0402932 | 12/1990 |
| EP | 1709840 | 10/2006 |
| JP | 2004-115559 | 4/2004 |
| JP | 2005-036117 | 2/2005 |
| WO | WO 2005086628 | 9/2005 |

OTHER PUBLICATIONS

Cao, Hong, et al. "Electroplex emission from a layer of a mixture of a europium complex and tris_8-quinolinolato/aluminum." Applied Surface Science, 161 (2000), pp. 443-447.
Zhang, Hui, et al. "Modified photoluminescence properties of rare-earth complex/polymer composite fibers prepared by electrospinning" Applied Physical Letters 90, pp. 103103-1-103103-3, (2007).
Zhang, Yong, et al. "Influence of Substitute Groups On the Properties of Aromatic Caboxylic Acid: $Eu^{3+}$ Complexes In Silica Xerogels." Journal of Physics and Chemistry of Solids. vol. 59, Nos. 6-7, pp. 1053-1057. 1998.
Qian, Guodong, et al. "Characterization of ternary coordination complex of europium with thenoyltrifluoroacetone and triphenylphosphine oxide in situ synthesized in ORMOSIL." Materials Research Bulletin, 36, (2001), pp. 2289-2299.
Brittain, H. G., et al. "Circularly Polarized Emission Studies on Chiral and Achiral Europium( 111) ,&Diketonate Complexes in an Optically Active Solvent." Journal of the American Chemical Society, 99:1; Jan. 5, 1977, pp. 65-70.
Ling, Q.D., et al. "Monochromatic light-emitting copolymers of N-vinylcarbazole and Eu-complexed 4-vinylbenzoate and their single layer high luminance PLEDs." Journal of Materials Chemistry, 14, pp. 2741-2748, (2004).
Parra, D.F., et al. "Characterization and photoluminescence properties of diglycidyl methacrylic resin doped with the $Eu3+$-β-diketonate complex." Journal of Applied Polymer Science (2006), 100(1), 406-412.
Bonzanini, R., et al. "Spectroscopic properties of polycarbonate and poly(methyl methacrylate) blends doped with europium(III) acetylacetonate." Journal of Luminescence (2006), 117(1), 61-67.
Mercier, F., et al. "XPS study of Eu(III) coordination compounds: core levels binding energies in solid mixed-oxo-compounds EumXxOy." Journal of Electron Spectroscopy and Related Phenomena (2006), 150(1), 21-26.
Dias, D. T., et al. "Photoacoustic characterization of PC/PMMA blends doped with Eu(acac)3." Journal de Physique IV: Proceedings (2005), 125(13th ICPPP, International Conference on Photoacoustic and Photothermal Phenomena, 2004), 387-390.
Bellusci, Anna, et al. "Synthesis and Luminescent Properties of Novel Lanthanide(III) β—Diketone Complexes with Nitrogen p,p'-Disubstituted Aromatic Ligands." Inorganic Chemistry (2005), 44(6), 1818-1825.
Bonzanini, R., et al. "Effects of europium (III) acetylacetonate doping on the miscibility and photoluminescent properties of polycarbonate and poly(methyl methacrylate) blends." Polymer (2005), 46(1), 253-259.

(Continued)

*Primary Examiner*—Philip C Tucker
*Assistant Examiner*—Michael N Orlando
(74) *Attorney, Agent, or Firm*—Roberts & Roberts, LLP

(57) ABSTRACT

The invention provides fluorescing compositions which cure by exposure to ultraviolet radiation and contain a europium compound which fluoresces at visible wavelengths. More particularly, the invention pertains to liquid, radiation-curable compositions comprising a substantially homogeneous fluid comprising, a fluorescing europium compound in an admixture of a polymerizable component and a polymerization initiator. Such find use as adhesives, coatings, and the like.

37 Claims, No Drawings

OTHER PUBLICATIONS

Soares-Santos, Paula C. R., et al. "Lanthanide compounds containing a benzo-15-crown-5 derivatised [60]fullerene and the related [Tb(H2O)3(NO3)2(acac)] C14H20O5 supramolecular adduct." New Journal of Chemistry (2004), 28(11), 1352-1358.

Fan, Xianping. "Luminescence behaviors of Eu3+β-diketonate complexes in sol-gelderived host materials." Materials Letters (2004), 58(16), 2217-2221.

Zheng, Youxuan, et al. "Red electroluminescent device with europium 1,1,1-trifluoroacetylacetonate complex as emissive center." Materials Letters (2002), 53(1-2), 52-56.

Shi, Yan-Li; et al. "Enhanced photoluminescence of Eu(III)-anchored porous anodic alumina film." Spectroscopy Letters (2001), 34(4), 419-426.

Li, Dong-Mei, et al. "Synthesis and electrochemical characteristics of lanthanide complexes with 2-nitro-5,10,15,20-tetraphenylporphyrin and acetylacetonate." Synthesis and Reactivity in Inorganic and Metal-Organic Chemistry (2000), 30(10), 1899-1915.

Petrochenkova, N. V., et al. "Spectroscopy (IR, luminescence) and polymeric transformations of the hetero-ligand Eu(III) and Tb(III) complexes with unsaturated acids." Russian Journal of Coordination Chemistry (Translation of Koordinatsionnaya Khimiya) (2000), 26(5), 373-376.

Marciniak, Bronislaw, et al. "Energy transfer processes in the quenching of triplet states of organic compounds by 1,3-diketonates of lanthanides(III) and magnesium(II) in acetonitrile solution. Laser flash photolysis studies." Journal of Photochemistry and Photobiology, A: Chemistry (1994), 78(1), 7-13.

Basu, Samita, et al. "The influence of trivalent lanthanide ions on the magnetic field effect of pyrene-dimethylaniline exciplex luminescence." Chemical Physics Letters (1987), 141(1-2), 115-18.

Pantoflicek, J. "Multiple-photon absorption in some europium(3+) chelates." Recent Adv. Opt. Phys., Proc. Congr. Int. Comm. Opt., 10th (1976), Meeting Date 1975, 329-34.

Page, A. G., et al. "Fluorescence decay of trivalent rare-earth ions." Indian Journal of Physics (1976), 50(2), 121-5.

Watson, W. M., "Examination of photophysics in rare earth chelates by laser-excited luminescence." Inorganic Chemistry (1975), 14(11), 2675-80.

Melby, L. R., et al. "Synthesis and Fluorescence of Some Trivalent Lanthanide Complexes." Journal of the American Chemical Society, vol. 86, Dec. 5, 1964, pp. 5117-5125.

Quirino, W.G. "Electroluminescence of a device based on europium β-diketonate with phosphine oxide complex." Thin Solid Films, 515 (2006), pp. 927-931.

Leif, Robert C., et al. "Increasing the Luminescence of Lanthanide Complexes." Cytometry Part A 69A:767-778 (2006).

Ohmori, Yutaka, et al. "Enhancement of electroluminescence utilizing confined energy transfer for red light emission." Thin Solid Films 393(2001), pp. 407-411.

* cited by examiner

RADIATION-CURABLE FLUORESCING COMPOSITIONS

BACKGROUND OF THE INVENTION

1. Field of the Invention

The invention relates to fluorescing compositions which cure by exposure to ultraviolet radiation and contain a compound which fluoresces at visible wavelengths. More particularly, the invention pertains to liquid, radiation-curable compositions comprising a substantially homogeneous fluid comprising a fluorescing europium compound in an admixture of a polymerizable component and a polymerization initiator. Such radiation-curable compositions find use as adhesives, coatings, and the like. In particular, the integrity of the cured composition can be inspected since they fluoresce at visible wavelengths.

2. Description of the Related Art

It is known in the art to produce light sensitive adhesive compositions which adhere to critical surfaces. For examples, in the field of medical devices, it is important to inspect catheter interfaces to assure that adjacent surfaces are actually bonded. It is known in the art to incorporate fluorescent compounds into coating compositions to provide a method for inspection. Methods are also known for detecting uniformity and identifying defects in coatings that have been applied to substrates. The prior art describes the incorporation of fluorescing agents into UV-cured coatings as a means for identifying the presence of the cured film and for ensuring that they are properly covered with the coatings. The use of UV coatings in such applications has created a requirement for measuring and monitoring the quality and depth of the coating.

The curing of radiation curable compositions depends upon the correct wavelength of light striking photoinitiators to generate free radicals by which polymerization of polymerizable components is effected and thereby to form a desired polymeric film. In the art, many of the fluorescing agents that are used for inspecting the quality of cure, such as substituted oxazole compounds and fluoranthenes, absorb radiation in the same region of the spectrum as the photoinitiators employed to generate the required free radicals. The resultant filtering or blocking phenomenon has limited the concentration of fluorescing agent that can be incorporated into a coating or adhesive formulation, since an excessive amount of the agent will preclude adequate reaction of the ingredients and adequate depth of cure. This has impeded the acceptance of UV compositions for coatings that require a bright fluorescent response. Small amounts of a fluorescing agent can generally be incorporated into compositions containing conventional UV-curing photoinitiators without significant detriment to the depth of cure achieved. However, when the level of fluorescent material is increased to improve the brightness of response, it is often found that the coating will not cure properly. Exposure to radiation in both the ultraviolet and also the visible spectral regions can have the additional effect of decomposing the fluorescent agent molecule, thereby further diminishing the response of the coating to light. The use of photoinitiators which respond to the visible part of the spectrum is one method to diminish the filtering effect of the fluorescing agent. However, these impart a red or dark yellow color to the resulting film or adhesive, and hence are undesirable. The prior art describes the use of mono and bisphosphine oxides as photoinitiators, which can provide excellent depth of cure in UV-curable coatings. The success of these phosphine oxides is attributed to their ability to respond in the near-UV/visible spectral region and to photo-bleach. One solution proposed by U.S. Pat. No. 6,080,450 uses a combination of a visible absorbing fluorescent agent with a phosphine oxide photoinitiator. The formulations contain less than 0.5% phosphine oxide. The phosphine oxide absorbs up to 440 nm, with a peak at 380 nm. The depth of cure is good. However, the amount of phosphine oxide must be increased to maintain the same depth of cure when the amount of fluorescing compound is increased. One commercial product uses diphenyl(2,4,6-trimethylbenzoyl) phosphine oxide (CAS 75980-60-8) in a blue fluorescing adhesive composition. Due to its lower absorption in the visible light region, more phosphine oxide is typically required. The phosphine oxides cause the liquid formulation to be slightly yellow. Typical ketone photoinitiators absorb light in the ultraviolet region, not in the visible region. Therefore, they do not discolor the formulations. However, these ketone photoinitiators are unsuitable in combination with blue fluorescing compounds that absorb in the visible light region. Other inorganic fluorescing compounds, such as zinc salts do not dissolve or disperse well in typical monomers. Organic non-blue fluorescing compounds, such as benzoxazinone derivatives also have a broad emission spectrum, however, they do not fluoresce after being dissolved in typical polymerizable monomers. Other organic fluorescing compounds with reactive side groups only fluoresce weakly after curing.

It has now been found that fluorescing compounds that do not absorb in the visible light region do not require a phosphine oxide as the photoinitiator. In particular, it has been found that rare earth metal compounds, such as europium compounds, are suitable. These fluorescing compounds have certain advantages, such as monochromatic red emission detectable in blue surroundings; easy solubility in polymerizable monomers; and non-leaching in the cured state. Europium chelates are well known in the prior art as diketonate and carboxylic acid complexes. The carboxylic acid complexes tend to be more light and heat stable. The europium chelates are readily soluble in typical polymerizable monomers.

SUMMARY OF THE INVENTION

The invention provides a liquid, radiation-curable composition comprising a substantially homogeneous fluid comprising, a fluorescing europium compound in an admixture of a polymerizable component and a polymerization initiator; the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator is present in an amount sufficient to initiate the polymerization of said polymerizable component.

The invention also provides a method of preparing a radiation-curable composition comprising forming a substantially homogenous fluid comprising a fluorescing europium compound in an admixture of a polymerizable component and a polymerization initiator, the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator is present in an amount sufficient to initiate the polymerization of said polymerizable component.

The invention further provides a method for adhering a first surface to a second surface which comprises:
a) applying to a first surface a radiation-curable adhesive composition comprising a substantially homogeneous fluid comprising a fluorescing europium compound in an admixture of a polymerizable component and a polymerization initiator; the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator is present in an amount sufficient to initiate the polymerization of said polymerizable component upon exposure to sufficient actinic radiation;
b) contacting a second surface to the radiation-curable adhesive composition; and
c) exposing the radiation-curable adhesive composition to sufficient actinic radiation to initiate the polymerization of said polymerizable component while maintaining contact of the radiation-curable adhesive composition with the first surface and the second surface.

The invention still further provides a method for curing a radiation-curable composition which comprises:
a) providing a radiation-curable composition comprising a substantially homogeneous fluid comprising a fluorescing europium compound in an admixture of a polymerizable component and a polymerization initiator; the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator is present in an amount sufficient to initiate the polymerization of said polymerizable component; and
b) exposing the radiation-curable composition to sufficient actinic radiation to initiate the polymerization of said polymerizable component.

The invention also provides a method for adhering a coating to a surface which comprises:
a) applying to a surface a radiation-curable coating composition comprising a substantially homogeneous fluid comprising a fluorescing europium compound in an admixture of a polymerizable component and a polymerization initiator; the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator is present in an amount sufficient to initiate the polymerization of said polymerizable component; and
b) exposing the radiation-curable coating composition to sufficient actinic radiation to initiate the polymerization of said polymerizable component.

DESCRIPTION OF THE INVENTION

The invention provides a liquid, radiation-curable composition comprising a substantially homogeneous fluid comprising, a fluorescing europium compound in an admixture with a polymerizable component and a polymerization initiator. The admixture comprises at least one of a combination of an organic, free radical polymerizable component and a free radical polymerization initiator, and/or a combination of an organic, cationic polymerizable component and a cationic polymerization initiator.

Preferably the fluorescing europium compound comprises a europium complex having at least one organic ligand. In one embodiment, the fluorescing europium compound comprises a europium complex having at least one beta-diketonate ligand, preferably a beta-diketonate ligand with an aromatic group, more preferably a beta-diketonate ligand with a heterocyclic aromatic group. In another embodiment, the fluorescing europium compound comprises a europium complex having at least one beta-diketonate ligand and at least one phosphine oxide ligand. In one embodiment the fluorescing europium compound has a melting point of about 100° C. or higher, preferably from about 150° C. or higher, and more preferably from about 200° C. or higher. Preferably the fluorescing europium compound has an extinction peak in a region of the electromagnetic spectrum which is different from an actinic radiation absorption peak of the polymerization initiator. Preferably the fluorescing europium compound has an extinction peak in an ultraviolet light region of the electromagnetic spectrum, and an emission peak in a visible light region of the electromagnetic spectrum. In a preferred embodiment, the fluorescing europium compound has an extinction peak in a region of the electromagnetic spectrum ranging from about 260 nm to about 400 nm and the polymerization initiator has an actinic radiation absorption peak in a region of the electromagnetic spectrum ranging from about 260 nm to about 400 nm; provided the europium compound has an extinction peak which is different from the actinic radiation absorption peak of the polymerization initiator.

Useful europium compounds non-exclusively include:
Tris(methacrylate)europium (III) (CAS 79718-24-4; mp>280° C.)
Tris(2,4-pentanedionato)europium (III) (CAS 14284-86-7; mp 188° C.)
Tris(2,2,6,6-tetramethyl-3,5-heptanedionato)europium (III) (CAS 15522-71-1; mp 188° C.)
Tris(thenoyltrifluoroacetonato)europium (III) (CAS 14054-87-6; mp 137° C.)
Tris(benzoylacetonato)mono(phenanthroline)europium (III) (CAS 18130-95-5; mp 182° C.)
Tris(dibenzoylmethanato)europium (III) (CAS 14552-07-9; mp 215° C.)
Tris(dibenzoylmethanato)mono(1,10-phenanthroline)europium (III) (CAS 17904-83-5; mp 188° C.)

Tris(dibenzoylmethanato)mono(5-amino 1,10-phenanthroline)europium (III) (CAS 352546-68-0; mp 165° C.)
Tris(6,6,7,7,8,8,8-heptafluoro-2,2-dimethyl-3,5-octanedionato)europium (III) (CAS 17631-68-4; mp 211° C.)
Tris(1-(2-thienyl)-4,4,4-trifluoro-1,3-butanedionato)europium (III) (CAS 14054-87-6; mp 137° C.)
Tris(1-(2-thienyl)-4,4,4-trifluoro-1,3-butanedionato)bis(triphenylphosphine oxide)europium (III) (CAS 12121-29-8; mp 246° C.)
Tris(3-trifluoromethylhydroxymethylene)-d-camphorato)europium (III) (CAS 34830-11-0; mp 200° C.)
Tris(3-(heptafluoropropylhydroxymethylene)-d-camphorato)europium(III) (CAS 34788-82-4; mp 160° C.)

The fluorescing europium compound is usually present in the radiation-curable composition in an amount of from about 0.01% to about 1%, more usually from about 0.02% to about 0.2%, and still more usually from about 0.03% to about 0.1% based on the weight of the radiation-curable composition.

The organic, free radical polymerizable component may be a monomer, oligomer or polymer having at least one and preferably two olefinically unsaturated double bonds. Such are well known in the art. Useful free radical polymerizable components include acrylates and methacrylates. Suitable for use as polymerizable components are ethers, esters and partial esters of acrylic and methacrylic acid and aromatic and aliphatic polyols preferably having from 2 to 30 carbon atoms, or cycloaliphatic polyols containing preferably 5 or 6 ring carbon atoms. These polyols can also be modified with epoxides such as ethylene oxide or propylene oxide. The partial esters and esters of polyoxyalkylene glycols are also suitable. Examples are ethylene glycol dimethacrylate, diethylene glycol dimethacrylate, triethylene glycol dimethacrylate, tetraethylene glycol dimethacrylate, polyethylene glycol dimethacrylates having an average molecular weight in the range from 200 to 2000, ethylene glycol diacrylate, diethylene glycol diacrylate, triethylene glycol diacrylate, tetraethylene glycol diacrylate, polyethylene glycol diacrylates having an average molecular weight in the range from 200 to 2000, trimethylolpropane ethoxylate trimethacrylate, trimethylolpropane polyethoxylate trimethacrylates having an average molecular weight in the range from 500 to 1500, trimethylolpropane ethoxylate triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethylacrylate, 1,3-butanediol dimethacrylate, sorbitol triacrylate, sorbitol tetraacrylate, sorbitol tetramethacrylate, sorbitol pentaacrylate, sorbitol hexaacrylate, oligoester acrylates, oligoester methacrylates, glycerol di- and triacrylate, 1,4-cyclohexane diacrylate, bisacrylates and bismethacrylates of polyethylene glycols having an average molecular weight from 100 to 1500, ethylene glycol diallyl ether, 1,1,1-trimethylolpropane triallyl ether, pentaerythritol triallyl ether, diallyl succinates and diallyl adipates or mixtures of the above compounds. Preferred multifunctional acrylate oligomers include, but are not limited to acrylated epoxies such as Interez Corporation's Novacure 3701, acrylated polyurethanes such as Sartomer Co.'s C9505, and acrylated polyesters such as Henkel Corp.'s Photomer 5007. Preferred photopolymerizable polymers include, but are not limited to acrylamido substituted cellulose acetate butyrate and cellulose acetate proprionate available from Bomar; acrylated epoxies available from Echo Resins; acrylated polyesters; acrylated polyethers and acrylated urethanes. A preferred photopolymerizable polymer is Jaylink 106E which is an acrylamido modified cellulose acetate butyrate polymer manufactured by Bomar Specialties. Such are described in U.S. Pat. Nos. 4,557,951 and 4,490,516. These describe a polymerizable cellulosic ester or ether product capable of homopolymerization or co-polymerization with vinyl monomers. They have a degree of substitution of between 2.0 and 2.9 reacted with an acrylamide reactant containing a methylol group to provide a degree of substitution of from about 0.05 to about 0.5 and to provide a degree of hydroxyl substitution of from about 0.05 to about 0.5. Another preferred photopolymerizable component is Sartomer 9041 which is a pentaacrylate ester manufactured by Sartomer. Other suitable reactive acrylate monomers include both monofunctional and polyfunctional compounds. Such monomers will generally be reaction products of acrylic acid and/or methacrylic acid with one or more mono- or poly-basic, substituted or unsubstituted, alkyl ($C_1$ to $C_{18}$), aryl or aralkyl alcohols. Acrylates in which the alcohol moiety contains a polar substituent (e.g., an hydroxyl, amine, halogen, cyano, heterocyclic or cyclohexyl group) are preferred because crosslinking, or other intermolecular bonding, is promoted thereby. Specifics acrylates include the following: hydroxyethylacrylate, isobornyl acrylate, tetrahydrofurfuryl acrylate, diethylene-glycoldiacrylate, 1,4-butanedioldiacrylate, butylene stearyl acrylate, glycoldiacrylate, neopentyl glycol diacrylate, octylacrylate and decylacrylate (normally in an admixture), polyethyleneglycol diacrylate, trimethylcyclohexyl acrylate, benzyl acrylate, butyleneglycoldiacrylate, polybutyleneglycol diacrylate, tripropyleneglycol diacrylate, trimethylolpropane triacrylate, di-trimethylolpropane tetraacrylate, pentaerythritol tetraacrylate, and di-pentaerythritol pentaacrylate. The corresponding methacrylate compounds are also useful. The organic, free radical polymerizable component is present in an amount sufficient to polymerize upon exposure to sufficient actinic radiation. In the preferred embodiment, the organic, free radical polymerizable component is present in the overall radiation-curable composition in an amount of from about 1% to about 99% by weight, preferably from about 50% to about 99% based on the non-solvent parts of the overall radiation-curable composition.

The inventive radiation-curable composition further uses a free radical polymerization initiator component which preferably photolytically generates free radicals. Examples of free radical generating components include photoinitiators which themselves photolytically generate free radicals by a fragmentation or Norrish type 1 mechanism. These latter have a carbon-carbonyl bond capable of cleavage at such bond to form two radicals, at least one of which is capable of photoinitiation. Suitable initiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins; diphenyl-2,4,6-trimethyl benzoylphosphine oxide; bis (pentafluorophenyl)titanocene;

The free radical generating component may comprise a combination of radical generating initiators which generate free radicals by a Norrish type 1 mechanism and a spectral sensitizer. Such a combination includes 2-methyl-1-[4-(methylthiophenyl]-2-morpholinopropanone available from Ciba Geigy as Irgacure 907 in combination with ethyl Michler's ketone (EMK) which is 4,4'-bisdiethylaminobenzophenone; Irgacure 907 in combination with 2-isopropylthioxanthanone (ITX); benzophenone in combination with EMK; benzophenone in combination with ITX; 2-benzyl-2-N,N-dimethylamino-1-(4-morpholinophenyl)-1-butanone which is available from Ciba-Geigy as Irgacure 369 in combination with EMK; Irgacure 369 in combination with ITX. In such cases, it is preferred that the weight ratio of radical polymerization initiator and spectral sensitizer ranges from about 5:1 to about 1:5. Other free radical polymerization initiators useful for this invention non-exclusively include triazines, such as chlorine radical generators such as 2-substituted-4,6-bis(trihalomethyl)-1,3,5-triazines. The foregoing substitution is with a chromophore group that imparts spectral sensitivity to the triazine to a portion of the electromagnetic radiation spectrum. Non-exclusive examples of these radical generators include 2-(4-methoxynaphth-1-yl)-4,6-bis(trichloromethyl)-1,3,5, -triazine which is available commercially from PCAS, Longjumeau Cedex (France) as Triazine B; 2-(4-methylthiophenyl)-4,6-bis(trichloromethyl)-1,3,5, -triazine; 2-(4-methoxystyryl)-4,6-bis(trichloromethyl)-1,3,5-triazine; 2-(4-diethylaminophenyl-1,3-butadienyl)-4,6-bis(trichloromethyl)-1,3,5-tri azine, among others. Also useful for the invention are Norrish type II mechanism compounds such as combinations of thioxanthones such as ITX and a source of abstractable hydrogen such as triethanolamine. In addition to the compounds identified above useful free radical photoinitiators include hexyltriaryl borates, camphorquinone, dimethoxy-2-phenylacetophenone (IRGACURE 651); 2-benzyl-2-N,N-dimethylamino-1-(4-morpholinophenyl)-1-butanone (IRGACURE 369); and 2-hydroxy-2-methyl-1-phenyl-propane-1-one (DAROCURE 1173), as well as the photoinitiators disclosed in U.S. Pat. No. 4,820,744, particularly at line 43, column 4, through line 7, column 7 (which disclosure is incorporated hereinto by reference thereto). Suitable alternative UV/visible photoinitiators include DAROCUR 4265, which is a 50 percent solution of 2,4,5-trimethyl benzoyl diphenyl-phosphine oxide in DAROCUR 1173, and IRGACURE 819, phosphine oxide, phenyl-bis(2,4,6-trimethyl) benzoyl; TPO (2,4,5-trimethyl (benzoyl)diphenylphosphine oxides); DAROCUR 1173 (HMPP) (2-hydroxymethyl-1-phenyl propanone); IRGACURE 184 (HCPK) (1-hydroxycyclohexyl phenyl ketone); IRGACURE 651 (BDK) (benzyldimethyl ketal, or 2,2 dimethoxyl-2-phenylacetophenone); an equal parts mixture of benzophenone and BM611 (N-3-dimethylaminopropyl methacrylamide); an equal parts mixture of DAROCUR 1173 and ITX (isopropyl thioxanthone [mixture of 2 and 4 isomers]; IRGACURE 369 (2-benzyl-2-N,N-dimethylamino-1-(4-morpholinophenyl)-1 butanone); IRGACURE 907 (2-methyl-1-[4-(methylthiophenyl]-2-morpholinopropanone); IRGACURE 2959 (4-(2-hydroxyethoxy)phenyl-(2-hydroxy-2-methylpropyl) ketone); an equal parts mixture of UVI-6990 and IRGACURE 819; and camphorquinone. Products identified hereinabove and hereinafter by the IRGACURE and DAROCUR designations are available from Ciba Specialty Chemicals Company; UVI-6990 is available from Dow Chemical Company. The free radical generating component is preferably present in an amount sufficient to effect polymerization of the polymerizable compound upon exposure to sufficient actinic radiation. The polymerization initiator may comprise from about 0.1% to about 50% of the non-solvent parts of the radiation-curable composition, more preferably from about 0.1% to about 10%.

The organic, cationic polymerizable component non-exclusively includes Araldite GY 6010 (a reaction product of bisphenol A with epichlorohydrin; CAS 25068-38-6; available from Huntsman), Epon 58006 (CAS 25068-38-6; available from Hexion), Epodil 743 (a phenyl glycidyl ether); DER 736 (a diglycidyl ether of poly(propylene glycol); CAS 41638-13-5; available from Ted Pella), UVR-6110 (a cycloaliphatic epoxide; CAS 2386-87-0; available from Dow), and UVR-6128 (CAS 3130-19-8; available from Dow). The organic, cationic polymerizable component may comprise from about 1% to about 99% of the non-solvent parts of the radiation-curable composition, more preferably from about 10% to about 90%, and most preferably from about 30% to about 70%.

The cationic polymerization initiator non-exclusively includes aryldiazonium salts, diaryliodonium salts, and onium salts of Group VIa elements, especially salts of positively charged sulfur. The anions are of low nucleophilicity, such as tetrafluoroborates or hexafluorophosphantes. Examples of diarylionium salts include Irgacure 250 (4-methylphenyl-(4-(2-methylpropyl)phenyl))iodonium hexafluorophosphate; CAS 344562-80-7; available from Ciba Specialty Company) and diphenyliodonium hexafluorophosphate (CAS 58109-40-3); and UVI-6990 (mixed triarylsulfonium hexafluorophosphate salts in 50% propylene carbonate). An example of a diaryldiazonium salt is 2,5-diethoxy-4(4-tolylthio) -benzenediazonium tetrafluoroborate. The cationic polymerization initiator may comprise from about 0.1% to about 10% of the non-solvent parts of the radiation-curable composition, more preferably from about 0.2% to about 5%, and most preferably from about 0.3% to about 3%.

In one embodiment, the admixture comprises a combination of an organic, free radical polymerizable component and a free radical polymerization initiator. In another embodiment the admixture comprises a combination of an organic, cationic polymerizable component and a cationic polymerization initiator. In yet another embodiment, the admixture comprises both a combination of an organic, free radical polymerizable component and a free radical polymerization initiator, and a combination of an organic, cationic polymerizable component and a cationic polymerization initiator.

Various optional additives may be added to the composition depending on the specific end-use of the radiation-curable composition and other various conditions. Examples of these include thermal polymerization inhibitors, plasticizers, fillers, electrically conductive particles, thermally conductive particles, spacers, colorants, adhesion promoters, surfactants, sensitizers, exposure indicators, and others. Examples of suitable thermal polymerization inhibitors include hydroquinone, hydroquinone monomethyl ether, catechol, beta-naphthol, mono-t-butylhydroquinone, pyrogallol, 4-tert-butylphenol, 2,5-di-tert-butylhydroquinone or 2,6-di-tertbutyl-4-methylphenol. A suitable amount of the thermopolymerization inhibitor which can be used ranges from about 0.01% to about 5%, preferably 0.1% to 3%, by weight, based on the weight of the non-solvent parts of the composition. Examples of suitable plasticizers include dioctyl phthalate, dibutyl phthalate, butyl phthalyl, butyl glycolate, tricresyl, phosphate, polyester series plasticizers and chlorinated paraffins. A suitable amount of the plasticizer can range from about 0.1% to about 20%, preferably 1% to 10%, by weight based on the weight of the non-solvent parts of the radiation-curable composition.

The radiation-curable composition of the invention finds use as an adhesive or a coating composition. Preferably the radiation-curable composition is substantially free of organic, nonreactive solvents. In a preferred embodiment of the radiation-curable composition has a polymerizable component which is a urethane acrylate and/or methacrylate oligomer and/or an epoxy oligomer in combination with an acrylate monomer and/or an methacrylate monomer; wherein the polymerization initiator comprises a ketone and/or a phosphine oxide; and wherein the fluorescing europium compound comprises a europium complex with at least one organic ligand.

The radiation-curable composition may be prepared by admixing the composition components until a substantially homogenous fluid is formed. In one use, the radiation-curable composition is formed and then exposed to sufficient actinic radiation to initiate the polymerization of said polymerizable component. In another embodiment, the radiation-curable composition is applied as a coating onto a surface and then exposed to sufficient actinic radiation to initiate the polymerization of said polymerizable component. In another embodiment the radiation-curable composition in the form of an adhesive is applied to a first surface and then contacting a second surface to the radiation-curable composition, and then exposing the radiation-curable adhesive composition to sufficient actinic radiation to initiate the polymerization of said polymerizable component while maintaining contact of the radiation-curable adhesive composition with the first surface and the second surface. The polymerization of the polymerizable component may be initiated by exposure to one or more of (a) ultraviolet light, (b) visible light, (c) electron beam radiation, or combinations thereof. In one embodiment the polymerization of said polymerizable component may be initiated by exposure to radiation having a wavelength of from about 390 nm to about 410 nm, preferably about 400 nm to about 405 nm. In another embodiment, the polymerization of the polymerizable component may be initiated by exposure to ultraviolet radiation, visible radiation, or combinations thereof, by means of a light emitting diode such as those having an emission wavelength of from about 390 nm to about 410 nm, preferably about 400 nm to about 405 nm.

The length of time for exposure is easily determinable by those skilled in the art and depends on the selection of the particular components of the radiation-curable composition. Typically exposure ranges from about 1 second to about 60 seconds, preferably from about 2 seconds to about 30 seconds, and more preferably from about 2 seconds to about 15 seconds. Typical exposure intensities range from about 10 mW/cm² to about 600 W/cm², preferably from about 50 mW/cm² to about 450 W/cm², and more preferably from about 100 mW/cm² to about 300 W/cm².

The following non-limiting examples serve to illustrate the invention.

EXAMPLES 1-3

The following three solutions were prepared. They did not contain a phosphine oxide photoinitiator. Samples 2 and 3 with the europium fluorescing compound cured at the same rate as the control sample 1 without the compound, under identical exposure conditions, namely, for 10 seconds with a metal halide lamp. No differences in the physical properties of three cured materials were noticed. UR7 is a difunctional urethane acrylate oligomer (polytetramethylene glycol ether, terminated with tolylene-2,4-diisocyanate, capped with 2-hydroxy ethyl methacrylate); IBOA is isobornyl acrylate (CAS 5888-33-5); BEA is 2-(((butylamino)carbonyl)oxy)ethyl acrylate (CAS 63225-53-6); DMA is N,N-dimethylacylamide; AA is acrylic acid (CAS 79-10⁻⁷); MBF is methyl benzoylformate (CAS 15206-55-0); and EU1 is tris(1-(2-thienyl)-4,4,4-trifluoro-1,3-butanedionato) bis(triphenylphosphine oxide)europium (III) (CAS 12121-29-8).

|  | 1 | 2 | 3 |
|---|---|---|---|
| UR7 | 62.5 | 62.5 | 62.5 |
| IBOA | 7.5 | 7.5 | 7.5 |
| BEA | 15.0 | 15.0 | 15.0 |
| DMA | 10.0 | 10.0 | 10.0 |
| AA | 2.0 | 2.0 | 2.0 |
| MBF | 3.0 | 3.0 | 3.0 |
| EU1 | — | 0.03 | 0.06 |

EXAMPLES 4-5

The following two solutions were prepared. They did not contain a phosphine oxide photoinitiator. Sample 5 with the europium fluorescing compound cured at the same rate as the control sample 4 without the compound, under identical exposure conditions, separately, for 20 seconds with a metal halide lamp and for 60 seconds with a 450 nm LED. No differences in the physical properties of four cured materials were noticed. However, a higher amount of fluorescence was noted with sample 5 when it was cured with the 450 nm LED exposure than with the metal halide lamp. UR3 is a difunctional urethane acrylate oligomer (CAS 72121-94-9; polyester of hexanedioic acid and diethylene glycol, terminated with isophorone diisocyanate, capped with 2-hydroxy ethyl methacrylate); CQ is 1,7,7-trimethyl-bicyclo (2,2,1) heptan-2,3-dione (CAS 10373-78-1).

|  | 4 | 5 |
|---|---|---|
| UR3 | 35.6 | 35.6 |
| IBOA | 44.0 | 44.0 |
| DMA | 20.0 | 20.0 |
| CQ | 0.4 | 0.4 |
| EU1 | — | 0.05 |

EXAMPLES 6-8

The following three solutions were prepared. They contained a combination of a phosphine oxide photoinitiator and a non-phosphine oxide photoinitiator. Samples 7 and 8 with the europium fluorescing compound cured at the same rate as the control sample 6 without the compound, under identical exposure conditions, namely, for 5 seconds with a metal halide lamp. No differences in the physical properties of three cured materials were noticed. UR5 is a difunctional urethane acrylate oligomer (CAS 69011-33-2; polyester of hexanedioic acid and diethylene glycol, terminated with 4,4'-methylenebis(cyclohexyl isocyanate), capped with 2-hydroxy ethyl acrylate); DP is 2,2-dimethyloxy-2-phenylacetophenone (CAS 24650-42-8); PPO is phenylbis(2,4,6-trimethylbenzoyl)phosphine oxide (CAS 162881-26-7); and GTS is (3-glycidyloxypropyl)trimethoxysilane (CAS 2530-83-8).

|  | 6 | 7 | 8 |
|---|---|---|---|
| UR5 | 30.0 | 30.0 | 30.0 |
| IBOA | 40.0 | 40.0 | 40.0 |
| DMA | 24.5 | 24.5 | 24.5 |
| DP | 3.0 | 3.0 | 3.0 |

-continued

|     | 6   | 7    | 8    |
|-----|-----|------|------|
| PPO | 0.5 | 0.5  | 0.5  |
| GTS | 2.0 | 2.0  | 2.0  |
| EU1 | —   | 0.03 | 0.06 |

EXAMPLES 9-12

The following four solutions were prepared. They contained a combination of a phosphine oxide photoinitiator and a non-phosphine oxide photoinitiator. They were exposed under identical conditions with a metal halide lamp. The excitation wavelength that gave the maximum emission was determined from an uncured 100 ppm solution of each individual EU compound in DMA in a cuvette. The amount of fluorescence at 612 nm was measured when the uncured 100 ppm solution was excited at that wavelength. The amount of fluorescence at 612 nm was also measured when a cured solid in the shape of a disk was made from the below listed solution and was excited at that wavelength. The cured disk with EU1 fluoresced the most. s EU2 is tris(dibenzoylmethanato)mono (5-amino-1,10-phenanthroline)europium (III) (CAS 352546-68-0); EU3 is tris(dibenzoylmethanato)mono(1,10-phenanthroline)europium (III) (CAS 17904-83-5); and EU4 is tris(benzoylacetonato)mono(phenanthroline)europium (III) (CAS 18130-95-5).

|                                | 9    | 10   | 11   | 12   |
|--------------------------------|------|------|------|------|
| UR5                            | 28.0 | 28.0 | 28.0 | 28.0 |
| IBOA                           | 38.0 | 38.0 | 38.0 | 38.0 |
| DMA                            | 28.5 | 28.5 | 28.5 | 28.5 |
| DP                             | 3.0  | 3.0  | 3.0  | 3.0  |
| PPO                            | 0.5  | 0.5  | 0.5  | 0.5  |
| GTS                            | 2.0  | 2.0  | 2.0  | 2.0  |
| EU1                            | 0.06 | —    | —    | —    |
| EU2                            | —    | 0.06 | —    | —    |
| EU3                            | —    | —    | 0.06 | —    |
| EU4                            | —    | —    | —    | 0.06 |
| Excitation wavelength (nm) for max emission | 376 | 403 | 401 | 367 |
| Fluorescence in cuvette        | 638  | 143  | 114  | 78   |
| Fluorescence of cured disk     | 104  | 48   | 40   | 13   |

EXAMPLES 13-16

The following four solutions were prepared. They contained a combination of a phosphine oxide photoinitiator and a non-phosphine oxide photoinitiator. They were exposed under identical conditions with a metal halide lamp. The amount of fluorescence at 612 nm was measured as a cured solid in the shape of a disk when excited at 384 nm. The front side, which had been towards the exposure lamp, and the back side of each disk was measured. EHA is 2-ethylhexyl-4-dimethyleneamino-benzoate (CAS 21245-02-3); and TEA is triethanol amine (CAS 102-71-6). The addition of these amines stabilized the fluorescence.

|      | 13   | 14   | 15   | 16   |
|------|------|------|------|------|
| UR5  | 28.0 | 28.0 | 28.0 | 28.0 |
| IBOA | 38.0 | 38.0 | 38.0 | 38.0 |
| DMA  | 28.5 | 28.5 | 28.5 | 28.5 |
| DP   | 3.0  | 3.0  | 3.0  | 3.0  |
| PPO  | 0.5  | 0.5  | 0.5  | 0.5  |
| GTS  | 2.0  | 2.0  | 2.0  | 2.0  |
| EU1  | 0.06 | 0.06 | 0.06 | 0.06 |
| EHA  | —    | 0.03 | —    | —    |
| TEA  | —    | —    | 0.03 | 0.06 |
| Front fluorescence | 105 | 384 | — | — |
| Back fluorescence  | 352 | 397 | 378 | 414 |

EXAMPLES 17-22

The following five solutions were prepared. They contained a combination of a phosphine oxide photoinitiator and a non-phosphine oxide photoinitiator. Samples 19 and 20 contained the blue fluorscing dye, whereas samples 21 and 22 contained the europium fluorescing compound. The samples were cured under identical exposure conditions, namely, for 25 seconds with a 405 nm LED. A difference in the depth of cure was noticed. At the same loading, the sample with the europium compound had a depth of cure twice that of the sample with the blue dye. HEMA is 2-hydroxyethyl methacrylate (CAS 868-77-9); HPK is 1-hydroxycyclohexyl phenyl ketone (CAS 947-19-3); and SC5 is 2,5-bis(5-tert-butylbenzoxazol)thiophene (CAS 7128-64-5).

|                    | 17   | 19   | 20   | 21   | 22   |
|--------------------|------|------|------|------|------|
| UR7                | 49.6 | 49.6 | 49.6 | 49.6 | 19.6 |
| IBOA               | 25.0 | 25.0 | 25.0 | 25.0 | 25.0 |
| HEMA               | 25.0 | 25.0 | 25.0 | 25.0 | 25.0 |
| HPK                | 0.2  | 0.2  | 0.2  | 0.2  | 0.2  |
| PPO                | 0.2  | 0.2  | 0.2  | 0.2  | 0.2  |
| SC5                | —    | 0.03 | 0.6  | —    | —    |
| EU1                | —    | —    | —    | 0.03 | 0.06 |
| Depth of cure (mm) | 48   | 21   | 18   | 41   | 37   |

EXAMPLES 23-24

The following two solutions were prepared. They did not contain a phosphine oxide photoinitiator. Samples 23 contained the blue fluorescing dye, whereas sample 24 contained the europium fluorescing compound. The samples were cured under identical exposure conditions, namely, for 30 seconds with a metal halide lamp. A difference in the depth of cure was noticed. At the same loading, the sample with the europium compound had a depth of cure over twice that of the sample with the blue dye. In addition, a 10 day leaching test was performed with the cured samples immersed in ethanol (CAS 64-17-5). The liquid from sample 23 fluoresced blue, whereas that from sample 24 did not fluoresce.

|      | 23   | 24   |
|------|------|------|
| UR7  | 62.5 | 62.5 |
| IBOA | 7.5  | 7.5  |
| BEA  | 15.0 | 15.0 |
| DMA  | 10.0 | 10.0 |
| AA   | 2.0  | 2.0  |
| MBF  | 3.0  | 3.0  |

-continued

|  | 23 | 24 |
|---|---|---|
| SC5 | 0.03 | — |
| EU1 | — | 0.03 |
| Depth of cure (mm) | 6 | 15 |
| Leach test | fail | pass |

EXAMPLES 25-26

The following two solutions were prepared. They did not contain a phosphine oxide photoinitiator. Samples 25 contained the blue fluorescing dye, whereas sample 26 contained the europium fluorescing compound. The solutions were sprayed onto a circuit board to a thickness of 100 um (which is equal to 0.004 inches). Sample 26 cured twice as fast as sample 25 with a metal halide lamp. The samples were also fully cured by placing the unexposed coatings in ambient air for 7 days. Both coatings fluoresced after moisture curing. UR1 is a difunctional urethane acrylate oligomer (CAS 37302-70-8; polyether of polyproylene glycol, terminated with tolylene-2,6-diisocyanate, capped with 2-hydroxyethyl acrylate); nBA is n-butyl acetate (CAS 123-86-4); DD is dibutyltin dilaurate (CAS 77-58-7); PHDI is poly(hexamethylene diisocyanate) (CAS 28182-81-2); HMDI is hexamethylene diisocyanate (CAS 822-06-0); and HMP is 2-hydroxy-2-methylpropiophenone (CAS 7473-98-5).

|  | 25 | 26 |
|---|---|---|
| UR1 | 54.2 | 54.2 |
| IBOA | 40.0 | 40.0 |
| nBA | 0.8 | 0.8 |
| DD | 0.5 | 0.5 |
| PHDI | 2.0 | 2.0 |
| HMDI | 0.5 | 0.5 |
| HMP | 2.0 | 2.0 |
| SC5 | 0.06 | — |
| EU1 | — | 0.06 |

EXAMPLES 27-28

The following two solutions were prepared. They did not contain a phosphine oxide photoinitiator. Samples 27 contained the blue fluorescing dye, whereas sample 28 contained the europium fluorescing compound. The solutions were sprayed onto a circuit board to a thickness of 100 um (which is equal to 0.004 inches). Sample 28 cured twice as fast as sample 27 with a metal halide lamp. The samples were also fully cured by baking them at 120° C. for 30 minutes. Both coatings fluoresced after baking. TBP is tert-butyl peroxybenzoate (CAS 614-45-9).

|  | 27 | 28 |
|---|---|---|
| UR1 | 48.0 | 48.0 |
| IBOA | 43.0 | 43.0 |
| HEMA | 2.0 | 2.0 |
| HMP | 1.0 | 1.0 |
| AA | 4.0 | 4.0 |
| TBP | 2.0 | 2.0 |
| SC5 | 0.06 | — |
| EU1 | — | 0.06 |

EXAMPLES 29-30

The following two solutions were prepared. They did not contain a phosphine oxide photoinitiator. Samples 29 contained the blue fluorescing dye, whereas sample 30 contained the europium fluorescing compound. The solutions were sprayed onto a circuit board to a thickness of 100 um (which is equal to 0.004 inches). Sample 30 cured twice as fast as sample 29 with a metal halide lamp. The samples were also fully cured by placing the unexposed coatings in ambient air for 3 days. Both coatings fluoresced after moisture curing. SiOH is a silanol terminated polydimethylsiloxane; SiSH is a mercapto terminated polydimethylsiloxane; and VT is vinyl tris(trimemethylsiloxy)silane (CAS 5356-84-3).

|  | 29 | 30 |
|---|---|---|
| SiOH | 55.0 | 55.0 |
| SiSH | 35.0 | 35.0 |
| VT | 7.5 | 7.5 |
| DD | 0.5 | 0.5 |
| HMP | 2.0 | 2.0 |
| SC5 | 0.06 | — |
| EU1 | — | 0.06 |

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A liquid, radiation-curable composition comprising a substantially homogeneous fluid comprising, a fluorescing europium compound in an admixture of a polymerizable component and a polymerization initiator; the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator does not contain phosphine oxide and is present in an amount sufficient to initiate the polymerization of said polymerizable component, wherein the polymerization initiator initiates the polymerization of said polymerizable component upon exposure to sufficient electron beam radiation or actinic radiation in the visible and/or ultraviolet region of the electromagnetic spectrum.

2. The composition of claim 1 wherein the polymerization initiator is present in an amount sufficient to initiate the polymerization of said polymerizable component upon exposure to sufficient actinic radiation.

3. The composition of claim 1 wherein the polymerization initiator initiates the polymerization of said polymerizable component upon exposure to sufficient actinic radiation in the visible and/or ultraviolet region of the electromagnetic spectrum.

4. The composition of claim 1 wherein the admixture comprises a combination of an organic, free radical polymerizable component and a free radical polymerization initiator.

5. The composition of claim 1 wherein the admixture comprises a combination of an organic, cationic polymerizable component and a cationic polymerization initiator.

6. The composition of claim 1 the admixture comprises both a combination of an organic, free radical polymerizable component and a free radical polymerization initiator, and a combination of an organic, cationic polymerizable component and a cationic polymerization initiator.

7. The composition of claim 1 which is an adhesive or a coating composition.

8. The composition of claim 1 wherein the fluorescing europium compound has an extinction peak in a region of the electromagnetic spectrum which is different from an actinic radiation absorption peak of the polymerization initiator.

9. The composition of claim 1 wherein the fluorescing europium compound has an extinction peak in an ultraviolet light region of the electromagnetic spectrum, and an emission peak in a visible light region of the electromagnetic spectrum.

10. The composition of claim 1 wherein the fluorescing europium compound has an extinction peak in a region of the electromagnetic spectrum ranging from about 260 nm to about 400 nm and the polymerization initiator has an actinic radiation absorption peak in a region of the electromagnetic spectrum ranging from about 260 nm to about 400 nm; provided the europium compound has an extinction peak which is different from the actinic radiation absorption peak of the polymerization initiator.

11. The composition of claim 1 wherein the fluorescing europium compound comprises a europium complex having at least one organic ligand.

12. The composition of claim 1 wherein the fluorescing europium compound comprises a europium complex having at least one beta-diketonate ligand.

13. The composition of claim 1 wherein the fluorescing europium compound comprises a europium complex having at least one beta-diketonate ligand and at least one phosphine oxide ligand.

14. The composition of claim 1 wherein the fluorescing europium compound is present in an amount of from about 0.01% to about 1% based on the weight of the radiation-curable composition.

15. The composition of claim 1 wherein said organic, free radical polymerizable component comprises an acrylate or methacrylate.

16. The composition of claim 1 wherein the polymerizable component is present in an amount of from about 50% to about 99% based on the weight of the radiation-curable composition.

17. The composition of claim 1 wherein said polymerization initiator is present in an amount of from about 0.1% to about 10% based on the weight of the radiation-curable composition.

18. The composition of claim 1 which is substantially free of organic, nonreactive solvents.

19. The composition of claim 1 wherein the polymerizable component comprises a urethane acrylate and/or methacrylate oligomer and/or an epoxy oligomer in combination with an acrylate monomer and/or an methacrylate monomer; wherein the polymerization initiator comprises a ketone and/or a phosphine oxide; and wherein the fluorescing europium compound comprises a europium complex with at least one organic ligand.

20. A method of preparing a radiation-curable composition comprising forming a substantially homogenous fluid comprising a fluorescing europium compound in an admixture of a polymerizable component and a polymerization initiator, the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator does not contain phosphine oxide and is present in an amount sufficient to initiate the polymerization of said polymerizable component, wherein the polymerization initiator initiates the polymerization of said polymerizable component upon exposure to sufficient electron beam radiation or actinic radiation in the visible and/or ultraviolet region of the electromagnetic spectrum.

21. The method of claim 20 wherein the polymerization initiator is present in an amount sufficient to initiate the polymerization of said polymerizable component upon exposure to sufficient actinic radiation.

22. The method of claim 20 wherein the polymerizable component comprises a urethane acrylate and/or methacrylate oligomer and/or an epoxy oligomer in combination with an acrylate monomer and/or an methacrylate monomer; wherein the polymerization initiator comprises a ketone and/or a phosphine oxide; and wherein the fluorescing europium compound comprises a europium complex with at least one organic ligand.

23. A method for adhering a first surface to a second surface which comprises:
  a) applying to a first surface a radiation-curable adhesive composition comprising a substantially homogeneous fluid comprising a fluorescing europium compound in an admixture of a polymerizable component and a polymerization initiator; the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator does not contain phosphine oxide and is present in an amount sufficient to initiate the polymerization of said polymerizable component upon exposure to sufficient actinic radiation, wherein the polymerization initiator initiates the polymerization of said polymerizable component upon exposure to sufficient electron beam radiation or actinic radiation in the visible and/or ultraviolet region of the electromagnetic spectrum;
  b) contacting a second surface to the radiation-curable adhesive composition; and
  c) exposing the radiation-curable adhesive composition to sufficient actinic radiation electron beam radiation or actinic radiation in the visible and/or ultraviolet region of the electromagnetic spectrum to initiate the polymerization of said polymerizable component while maintaining contact of the radiation-curable adhesive composition with the first surface and the second surface.

24. The method of claim 23 wherein the polymerizable component comprises a urethane acrylate and/or methacrylate oligomer and/or an epoxy oligomer in combination with an acrylate monomer and/or an methacrylate monomer; wherein the polymerization initiator comprises a ketone and/or a phosphine oxide; and wherein the fluorescing europium compound comprises a europium complex with at least one organic ligand.

25. A method for curing a radiation-curable composition which comprises:
a) providing a radiation-curable composition comprising a substantially homogeneous fluid comprising a fluorescing europium compound in an admixture of a polymerizable component and a polymerization initiator; the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator does not contain phosphine oxide and is present in an amount sufficient to initiate the polymerization of said polymerizable component, wherein the polymerization initiator initiates the polymerization of said polymerizable component upon exposure to sufficient electron beam radiation or actinic radiation in the visible and/or ultraviolet region of the electromagnetic spectrum; and
b) exposing the radiation-curable composition to sufficient electron beam radiation or actinic radiation in the visible and/or ultraviolet region of the electromagnetic spectrum to initiate the polymerization of said polymerizable component.

26. The method of claim 25 wherein the polymerizable component comprises a urethane acrylate and/or methacrylate oligomer and/or an epoxy oligomer in combination with an acrylate monomer and/or an methacrylate monomer; wherein the polymerization initiator comprises a ketone and/or a phosphine oxide; and wherein the fluorescing europium compound comprises a europium complex with at least one organic ligand.

27. A method for adhering a coating to a surface which comprises
a) applying to a surface a radiation-curable coating composition comprising a substantially homogeneous fluid comprising a fluorescing europium compound in an admixture of a polymerizable component and a polymerization initiator; the polymerizable component comprising at least one organic, free radical polymerizable component and/or at least one organic, cationic polymerizable component; the polymerization initiator comprising at least one free radical polymerization initiator and/or at least one cationic polymerization initiator; the admixture comprising a combination of an organic, free radical polymerizable component and a free radical polymerization initiator, and/or a combination of an organic, cationic polymerizable component and a cationic polymerization initiator; wherein the polymerization initiator does not contain phosphine oxide and is present in an amount sufficient to initiate the polymerization of said polymerizable component, wherein the polymerization initiator initiates the polymerization of said polymerizable component upon exposure to sufficient electron beam radiation or actinic radiation in the visible and/or ultraviolet region of the electromagnetic spectrum; and
b) exposing the radiation-curable coating composition to sufficient electron beam radiation or actinic radiation in the visible and/or ultraviolet region of the electromagnetic spectrum to initiate the polymerization of said polymerizable component.

28. The method of claim 27 wherein the polymerizable component comprises a urethane acrylate and/or methacrylate oligomer and/or an epoxy oligomer in combination with an acrylate monomer and/or an methacrylate monomer; wherein the polymerization initiator comprises a ketone and/or a phosphine oxide; and wherein the fluorescing europium compound comprises a europium complex with at least one organic ligand.

29. The method of claim 23 wherein the polymerization of said polymerizable component is initiated by exposure to one or more of (a) ultraviolet light, (b) visible light (c) electron beam radiation, or combinations thereof.

30. The method of claim 25 wherein the polymerization of said polymerizable component is initiated by exposure to one or more of (a) ultraviolet light, (b) visible light (c) electron beam radiation, or combinations thereof.

31. The method of claim 27 wherein the polymerization of said polymerizable component is initiated by exposure to one or more of (a) ultraviolet light, (b) visible light (c) electron beam radiation, or combinations thereof.

32. The method of claim 23 wherein the polymerization of said polymerizable component is initiated by exposure to radiation having a wavelength of from about 390 nm to about 410 nm.

33. The method of claim 25 wherein the polymerization of said polymerizable component is initiated by exposure to radiation having a wavelength of from about 390 nm to about 410 nm.

34. The method of claim 27 wherein the polymerization of said polymerizable component is initiated by exposure to radiation having a wavelength of from about 390 nm to about 410 nm.

35. The method of claim 23 wherein the polymerization of said polymerizable component is initiated by exposure to ultraviolet radiation, visible radiation, or combinations thereof, by means of a light emitting diode.

36. The method of claim 25 wherein the polymerization of said polymerizable component is initiated by exposure to ultraviolet radiation, visible radiation, or combinations thereof, by means of a light emitting diode.

37. The method of claim 27 wherein the polymerization of said polymerizable component is initiated by exposure to ultraviolet radiation, visible radiation, or combinations thereof, by means of a light emitting diode.

* * * * *